May 13, 1958 — G. GOZZOLI — 2,834,552
WATER-COOLED MOTOR-DRIVEN COFFEE MILL
Filed Oct. 23, 1956
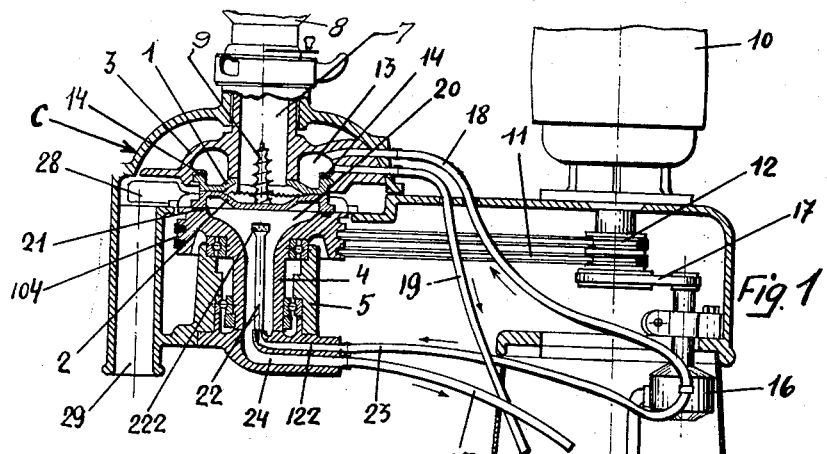
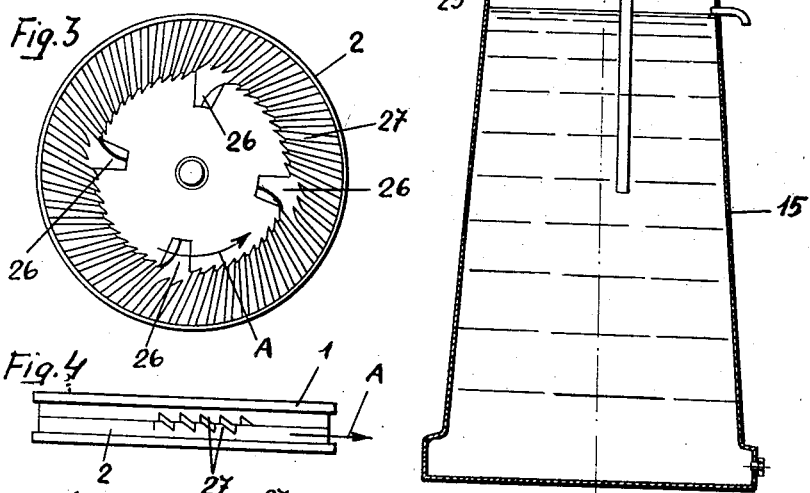
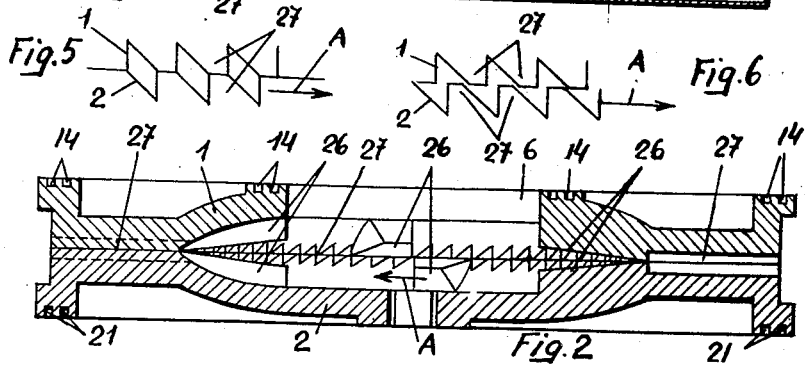
Inventor
Giovanni Gozzoli
by
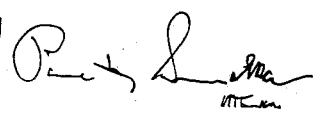
Attorney

United States Patent Office 2,834,552
Patented May 13, 1958

2,834,552
WATER-COOLED MOTOR-DRIVEN COFFEE MILL

Giovanni Gozzoli, Bologna, Italy

Application October 23, 1956, Serial No. 617,839

3 Claims. (Cl. 241—67)

This invention relates to motor-driven coffee mills provided with water-cooled grinding plates, particularly adapted for grinding large coffee quantities.

The main object of the invention is to provide a coffee mill which includes a pair of horizontally disposed co-operating grinding discs or plates, with a very simple and efficient cooling device for said grinding plates or discs.

The invention more particularly provides an improved cooling device for horizontal grinding discs of large motor-driven coffee mills, the driven lower grinding disc being cooled by spraying water against its back side; such arrangement of the cooling means avoids the provision of baffle plates and gaskets or other means and safely prevents water or other cooling liquid from escaping the space formed at the back side of the cooled grinding discs.

In a preferred embodiment of the invention, the horizontal grinding plates are arranged in a housing and the driven grinding plate is the lower one and is attached to a carrier member provided with a hollow shaft, while the upper plate is provided with a central bore in communication with the coffee feed chute. The grinding plates are mounted in a housing, with their rear marginal portions bearing against corresponding surfaces of the housing which is so shaped as to leave behind each grinding plate a free space or jacket to be used for circulating therein a cooling fluid (usually water) whereby the jacket of the fixed grinding plate is fluid-tight and is provided with an inlet port in communication with the delivery of a circulation pump and with an outlet port leading to a fluid tank, whereas the cooling of the rotating grinding plate is effected by spraying of water thereagainst, so that the joint between the periphery of said grinding plate and the corresponding housing part needs not to be perfectly fluid-tight.

Other characteristic features and advantages of the invention will appear from the following specification when read with the accompanying drawing wherein:

Figure 1 shows a vertical sectional view of a coffee mill according to the invention.

Figure 2 shows a vertical cross section in enlarged scale of the two grinding plates or discs used in the mill.

Figure 3 shows in a smaller scale than that used in Fig. 2 a top view of the lower rotatable grinding plate or disc.

Figure 4 is a side view of the two grinding plates or discs, and

Figures 5 and 6 show diagrammatically some of the end teeth of the two grinding plates in two different positions with respect to one another.

In the drawings, 1 and 2 indicate two horizontal superposed grinding plates or discs, the upper plate 1 is fastened to the stationary supporting member 3 mounted in the mill housing C. The lower plate 2 is rotatably mounted in said housing C and is fastened on the plate carrier head 104 which is provided with a pulley-shaped skirt and with a lower hollow stub shaft 4 rotatably mounted in a supporting sleeve 5 forming part of the housing C. The coffee to be ground is fed from above to the two grinding plates 1 and 2 through a large central bore 6 provided on the stationary upper grinding plate 1 to which a tubular chute 7 is tightly fitted, said chute being formed in the supporting member 3 of said grinding plate 1 and being connected at its upper end to the outlet of the coffee container 8. In the center of the lower rotatable grinding plate 2 a screw conveyor 9 is coaxially fitted, so as to project through the bore 6 of the upper grinding plate 1 into the feed chute 7, said screw conveyor serving for mixing and drawing the coffee from said chute 7 and conveying the same into the space between the grinding plates 1 and 2. The rotatable grinding plate 2 is driven by a motor 10 by means of driving belts 11 tensioned between motor pulley 12 and the pulley-shaped skirt of the plate carrier head. Both grinding plates 1 and 2 are water-cooled. For this purpose the supporting member 3 for the upper grinding plate 1 is provided on its lower side, around the feed chute 7 with a deep and large groove 13 which is tightly closed by a corresponding part of said grinding plate 1 when this latter is mounted on the supporting member 3. Gaskets 14 are provided to ensure a tight fit. Thus, between the supporting member 3 and the outer side of the grinding plate 1 an annular jacket 13 is formed in which cooling water is circulated in direct contact with the back of the grinding plate 1. The cooling water is contained in a tank 15 which is preferably formed by the hollow support or base 15 of the mill. A pump 16 incorporated in said support 15 and driven by the motor 10 by means of the belt drive 17 sucks water from the tank 15 and delivers the same through pipe 18 and conduit 13 into the jacket 13, from which it returns into the tank 15 through pipe 19. The level of the cooling liquid in the support 15 is maintained below the pump 16 by conventional means such as an overflow outlet.

The cooling of the lower rotatable grinding plate is effected by spraying water thereagainst. The hollow stub shaft 4 terminates upwardly into a funnel-shaped portion 20 having a seat 104 on which the grinding plate is fitted, the tightness of the joint being ensured by gaskets 21. The lower part of said shaft bears on the end of a hollow tubular member which contains cooling water delivery conduit 122 and a discharge conduit 24. The delivery conduit 122 is provided at its outlet end with an upright tube 22 extending centrally of the stub shaft 4 and ending in the chamber formed by the flaring portion 20 of said shaft and the lower grinding plate 2. A spraying device such as a multi-nozzle or a perforated spray-head 222 is provided on the end of said tube 22. The discharge conduit 24 opens into the bore of stub shaft 4 all around the upright tube 22 and at its outlet end is connected to a return tube 25 which opens into the cooling liquid tank 15. The outer end of said delivery conduit 122 is connected by a tube 23 to the delivery side of the pump 16.

From the foregoing it is apparent that by the described arrangement an efficient cooling system has been provided for both grinding plates, the cooling liquid (usually water) contained in the tank 15 being pumped by the same pump 16 through tubes 18 and 23 so as to come into contact with both grinding plates 1 and 2 and is returned to tank 15 through the tubes 19 and 25 after having cooled said plates.

The large central bore 6 in the grinding plate 1 permits the coffee to fall onto the slightly concave central part of the lower grinding plate 2. Concentrically of said central bore 6 of the upper grinding plate 1 and of said concave part of the lower grinding plate 2 two cooperating rows of grinding teeth 26 and 27 are provided. The inner teeth or crushing teeth 26 which are few in number and spaced, are quite large and serve to crush the coffee grains, whereas the outer teeth 27 are the proper grinding teeth and serve for grinding the crushed coffee to the desired fineness.

As shown particularly in Figs. 5 and 6, the grinding teeth 27 are provided with sloping sides and are preferably saw tooth-shaped. The inclination of said teeth sides is in the same direction in both plates, when they are mounted with the toothed part in abutting relation, and the lower grinding plate 2 is driven in the direction of the inclined sides of its grinding teeth, so that the crushed coffee is ground by a combined crushing and rolling action. The powdered coffee emerges between the grinding plates 1 and 2 into an annular chamber 28 formed by the housing C and the supporting member 3 is discharged through chute 29 formed in the housing C.

As apparent from Figure 2, the ridges of the crushing teeth 26 of one of the grinding plates are spaced from the ridges of the corresponding teeth of the opposite plate, whereas the ridges of the grinding teeth 27 of either grinding plate are, at least in part, in sliding contact with the ridges of the corresponding teeth of the opposite grinding plate.

Although one form of the invention has been shown and described by way of illustration, it will be understood that it may be constructed in various other embodiments which come within the scope of the appended claims.

I claim:

1. In a motor-driven coffee mill the combination comprising a housing; a container for the coffee to be ground; an upper and a lower horizontal toothed grinding disc arranged below said container for cooperation; a central opening in the upper grinding disc; a conduit leading from said container to said opening; a support for said upper grinding disc integral with said housing and forming with the rear surface of said upper grinding disc a tight annular jacket surrounding said conduit; a hollow vertical stub shaft projecting from the back of the said lower grinding disc and having a funnel-shaped end portion adjacent to said disc; a screw-conveyor projecting from the other side or said lower disc into said conduit; means for rotatably mounting said lower grinding disc in said housing with the ridges of its outer teeth row in sliding contact with the ridges of the corresponding teeth row of the said upper grinding disc; means for rotating said lower grinding disc; a tube mounted coaxially in said hollow stub shaft; a spraying device arranged at the end of said tube within said funnel-shaped end portion of said shaft; a cooling liquid tank; a pump with conduits delivering liquid from said tank through said jacket and through said spraying device against the back of said lower grinding disc; and conduits for returning said liquid back into said tank.

2. A motor-driven coffee mill according to claim 1, comprising a hollow support or base forming the said tank for the cooling liquid.

3. A motor-driven coffee mill according to claim 1, comprising a hollow support or base forming the tank for the cooling liquid; means in said hollow support for keeping the liquid below a certain level; and a pump in said support arranged above said liquid level.

References Cited in the file of this patent

UNITED STATES PATENTS

| | | |
|---|---|---|
| 1,046,019 | Reynolds | Dec. 3, 1912 |
| 1,233,911 | Rios | July 17, 1917 |
| 2,549,275 | Wood | Apr. 17, 1951 |

FOREIGN PATENTS

| | | |
|---|---|---|
| 262,161 | Great Britain | Dec. 2, 1926 |
| 688,061 | Germany | Feb. 12, 1940 |
| 963,205 | France | Dec. 26, 1949 |